US010846543B2

(12) United States Patent
Duan et al.

(10) Patent No.: US 10,846,543 B2
(45) Date of Patent: Nov. 24, 2020

(54) METHOD AND APPARATUS FOR DETECTING LANE LINE, AND MEDIUM

(71) Applicant: Baidu Online Network Technology (Beijing) Co., Ltd., Beijing (CN)

(72) Inventors: Xiong Duan, Beijing (CN); Xianpeng Lang, Beijing (CN); Wang Zhou, Beijing (CN); Miao Yan, Beijing (CN); Yifei Zhan, Beijing (CN); Changjie Ma, Beijing (CN); Yonggang Jin, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 152 days.

(21) Appl. No.: 16/230,998

(22) Filed: Dec. 21, 2018

(65) Prior Publication Data

US 2019/0205664 A1    Jul. 4, 2019

(30) Foreign Application Priority Data

Dec. 29, 2017  (CN) .......................... 2017 1 1485383

(51) Int. Cl.
*G06K 9/00*    (2006.01)
*G06K 9/03*    (2006.01)
(Continued)

(52) U.S. Cl.
CPC .......... *G06K 9/00798* (2013.01); *G06K 9/03* (2013.01); *G06K 9/38* (2013.01); *G06K 9/40* (2013.01);
(Continued)

(58) Field of Classification Search
CPC ........ G06K 9/00798; G06K 9/03; G06K 9/38; G06K 9/40; G06K 9/48; G06K 9/6256;
(Continued)

(56) References Cited

U.S. PATENT DOCUMENTS 8,305,445 B2 * 11/2012 Mori ................. G06K 9/00798
348/148
10,150,473 B2 * 12/2018 Aharony ........... B60W 30/0953
(Continued)

FOREIGN PATENT DOCUMENTS

| KR | 10-2013-0095967 A | 8/2013 |
| KR | 10-2014-0103441 A | 8/2014 |
| WO | WO 2017/020528 A1 | 2/2017 |

OTHER PUBLICATIONS

"A Method of real Time and Fast Lane Line Detection", Honghua Xu, 2018, 2018 Eighth International Conference on Instrumentation & Measurement, Computer, Communication and Control (IMCCC) (Year: 2018).*

(Continued)

*Primary Examiner* — Michael S Osinski
(74) *Attorney, Agent, or Firm* — Nixon Peabody LLP

(57) ABSTRACT

According to the exemplary embodiments of the present disclosure, a method and apparatus for detecting a lane line, and a medium are provided. A method for generating a lane line detection model includes: detecting a lane line in an original image to generate a first image associated with the detected lane line; acquiring a second image generated based on the original image and associated with a marked lane line; generating at least one tag indicating whether the detected lane line is accurate, based on the first image and the second image; and training a classifier model for automatically identifying the lane line, based on the first image and the at least one tag. In such case, the lane line detection may be achieved in a simple and effective way.

18 Claims, 10 Drawing Sheets

(51) Int. Cl.
*G06K 9/40* (2006.01)
*G06K 9/62* (2006.01)
*G06K 9/48* (2006.01)
*G06K 9/38* (2006.01)
*G06T 7/73* (2017.01)
*G06T 7/13* (2017.01)
*G06T 5/00* (2006.01)
*G08G 1/16* (2006.01)
*G06K 9/36* (2006.01)

(52) U.S. Cl.
CPC .............. *G06K 9/48* (2013.01); *G06K 9/6256* (2013.01); *G06T 5/002* (2013.01); *G06T 7/13* (2017.01); *G06T 7/74* (2017.01); *G08G 1/167* (2013.01); *G06K 9/6273* (2013.01); *G06K 2009/363* (2013.01); *G06T 2207/30256* (2013.01)

(58) Field of Classification Search
CPC ........... G06K 9/00805; G06K 9/00818; G06K 9/00791; G06K 9/00825; G06K 9/4604; G06K 9/4638; G06T 7/74; G06T 7/13; G06T 5/002; G06T 2207/30256; G06T 2207/30261; G06T 2207/20081; G08G 1/167; B60R 2300/804
See application file for complete search history.

(56) References Cited

U.S. PATENT DOCUMENTS

| | | | | |
|---|---|---|---|---|
| 10,173,593 B2* | 1/2019 | Yoo | G08G 1/167 |
| 10,175,697 B1* | 1/2019 | Sachdeva | H04N 13/361 |
| 10,699,134 B2* | 6/2020 | He | G06K 9/00 |
| 2008/0273752 A1* | 11/2008 | Zhu | G08G 1/167 382/103 |
| 2009/0091475 A1* | 4/2009 | Watanabe | B62D 15/028 340/932.2 |
| 2010/0088031 A1* | 4/2010 | Nielsen | G06Q 10/06 702/5 |
| 2010/0100268 A1* | 4/2010 | Zhang | G06K 9/00825 701/25 |
| 2010/0238283 A1* | 9/2010 | Kim | G06T 7/73 348/135 |
| 2013/0046462 A1* | 2/2013 | Feyereisen | G08G 5/025 701/457 |
| 2013/0184938 A1* | 7/2013 | Dolinar | G06K 9/00791 701/41 |
| 2013/0190981 A1* | 7/2013 | Dolinar | F16M 11/2014 701/41 |
| 2014/0118552 A1* | 5/2014 | Takahama | G08G 1/167 348/148 |
| 2014/0132753 A1* | 5/2014 | Watanabe | G01C 21/3626 348/116 |
| 2014/0278052 A1* | 9/2014 | Slavin | G08G 1/0145 701/400 |
| 2016/0170487 A1* | 6/2016 | Saisho | B60K 35/00 345/156 |
| 2016/0209511 A1* | 7/2016 | Dolinar | E01C 23/163 |
| 2016/0300491 A1* | 10/2016 | Fukuda | B60R 1/00 |
| 2017/0084178 A1* | 3/2017 | Jain | G08G 1/096827 |
| 2017/0363430 A1* | 12/2017 | Al-Dahle | G01C 21/3415 |
| 2018/0012085 A1* | 1/2018 | Blayvas | H04N 13/239 |
| 2018/0046867 A1* | 2/2018 | Yang | G06K 9/6215 |
| 2018/0120859 A1* | 5/2018 | Eagelberg | G05D 1/0246 |
| 2018/0181820 A1* | 6/2018 | Ide | B60W 30/12 |
| 2018/0225527 A1 | 8/2018 | He | |
| 2018/0253975 A1* | 9/2018 | Mizutani | B60W 30/0956 |
| 2018/0307930 A1* | 10/2018 | Mittal | G06K 9/00798 |
| 2018/0373941 A1* | 12/2018 | Kwant | G08G 1/0129 |
| 2019/0027030 A1* | 1/2019 | Hou | G08G 1/09623 |
| 2019/0172218 A1* | 6/2019 | Maruoka | B60K 35/00 |
| 2019/0179034 A1* | 6/2019 | Tubergen | B61L 25/025 |
| 2019/0243372 A1* | 8/2019 | Huval | G08G 1/167 |
| 2019/0266418 A1* | 8/2019 | Xu | G06K 9/00798 |
| 2019/0272435 A1* | 9/2019 | Kundu | G06K 9/00798 |
| 2019/0286922 A1* | 9/2019 | Liu | G01C 21/3446 |

OTHER PUBLICATIONS

B. He et al.; "Accurate and Robust Lane Detection based on Dual-View Convolutional Neutral Network"; 2016 IEEE Intelligent Vehicles Symposium (IV), Gothenburg, Sweden; Jun. 19-22, 2016, pp. 1041-1046; XP32939095A (6 pages).

J. Li et al.; "Deep Neural Network for Structural Prediction and Lane Detection in Traffic Scene"; IEEE Transactions on Neural Networks and Learning Systems, vol. 28, No. 3, pp. 690-703; Mar. 2017; XP55352562A (14 pages).

J. Kim et al.; "Robust Lane Detection Based on Convolutional Neural Network and Random Sample Consensus"; ICONIP 2014, Part 1, LNCS 8834, pp. 454-461; Springer International Publishing Switzerland; XP55490419A (8 pages).

M. Aly; "Real time Detection of Lane Markers in Urban Streets"; 2008 IEEE Intelligent Vehicles Symposium, Eindhoven University of Technology, Eindhoven, The Netherlands, Jun. 4-6, 2008; pp. 7-12; XP31318797A (6 pages).

* cited by examiner

METHOD AND APPARATUS FOR DETECTING LANE LINE, AND MEDIUM

CROSS-REFERENCE TO RELATED APPLICATIONS

This application claims priority to Chinese Patent Application No. 201711485383.6, filed in China on Dec. 29, 2017, the content of which is incorporated herein by reference in its entirety.

TECHNICAL FIELD

Embodiments of the present disclosure mainly relate to the field of image detection, and specifically to a method and apparatus for detecting a lane line, and a medium.

BACKGROUND

At present, the research and development of the high-precision map and the autonomous driving technology has been paid more attention. Compared with the traditional electronic map, the absolute coordinate accuracy of the high-precision map is higher and the road information contained in the high-precision map is more abundant. The development of the high-precision map accelerates the implementation of the autonomous driving. For example, the high-precision map can improve the safety and reliability of the autonomous driving.

In the high-precision map and the autonomous driving, out of the needs for the high-precision map and the road perception, a vehicle needs to detect the lane lines in a road. For example, the accurate position coordinates of the lane line points on the lane lines need to be extracted from the road information captured by a vehicle mounted camera. However, since there is interference of light in the environment, the lane line points cannot be effectively extracted by only using the traditional computer vision algorithm. In addition, if the lane line points are classified using the deep learning algorithm which only uses, for example, a convolutional neural network, it is difficult to determine the accuracy of the positions of the lane lines.

SUMMARY

According to exemplary embodiments of the present disclosure, a solution of detecting a lane line is provided.

In a first aspect, the present disclosure provides a method for generating a lane line detection model. The method includes: detecting a lane line in an original image to generate a first image associated with a detected lane line; and acquiring a second image generated based on the original image and associated with marked lane line. The method further includes: generating at least one tag indicating whether the detected lane line is accurate, based on the first image and the second image; and training a classifier model for automatically identifying the lane line, based on the first image and the at least one tag.

In a second aspect, the present disclosure provides a method for detecting lane lines. The method includes: detecting a lane line in an original image to generate a first image associated with the detected lane line. The method further includes: inputting the first image into the classifier model according to the first aspect of the present disclosure, to automatically identify the lane line.

In a third aspect, the present disclosure provides an apparatus for generating a lane line detection model. The apparatus includes: a first image generating module, configured to detect a lane line in an original image to generate a first image associated with a detected lane line; a second image acquiring module, configured to acquire a second image generated based on the original image and associated with marked lane line; a tag generating module, configured to generate at least one tag indicating whether the detected lane line is accurate, based on the first image and the second image; and a model training module, configured to train a classifier model for automatically identifying the lane line, based on the first image and the at least one tag.

In a fourth aspect, the present disclosure provides an apparatus for detecting lane lines. The apparatus includes: a first image generating module, configured to detect a lane line in an original image to generate a first image associated with the detected lane line; and a model applying module, configured to input the first image into the classifier model according to the first aspect of the present disclosure, to automatically identify the lane line.

In a fifth aspect, the present disclosure provides a device. The device includes: one or more processors; and a storage device, configured to store one or more programs. The one or more programs, when executed by the one or more processors, cause the one or more processors to implement the method according to the first aspect of the present disclosure.

In a sixth aspect, the present disclosure provides a device. The device includes: one or more processors; and a storage device, configured to store one or more programs. The one or more programs, when executed by the one or more processors, cause the one or more processors to implement the method according to the second aspect of the present disclosure.

In a seventh aspect, the present disclosure provides a computer readable medium storing a computer program. The program, when executed by a processor, implements the method according to the first aspect of the present disclosure.

In an eighth aspect, the present disclosure provides a computer readable medium storing a computer program. The program, when executed by a processor, implements the method according to the second aspect of the present disclosure.

It should be understood that the content of the present disclosure is not intended to limit the key or important features of the embodiments of the present disclosure, and the scope of the present disclosure. Other features of the present disclosure will be easily understood through the following description.

BRIEF DESCRIPTION OF THE DRAWINGS

The above and other features, advantages, and aspects of the embodiments of the present disclosure will become more apparent in combination with the accompanying drawings and with reference to the following detailed description. In the accompanying drawings, the same or similar reference numerals represent the same or similar elements.

DETAILED DESCRIPTION OF EMBODIMENTS

Figure 1:
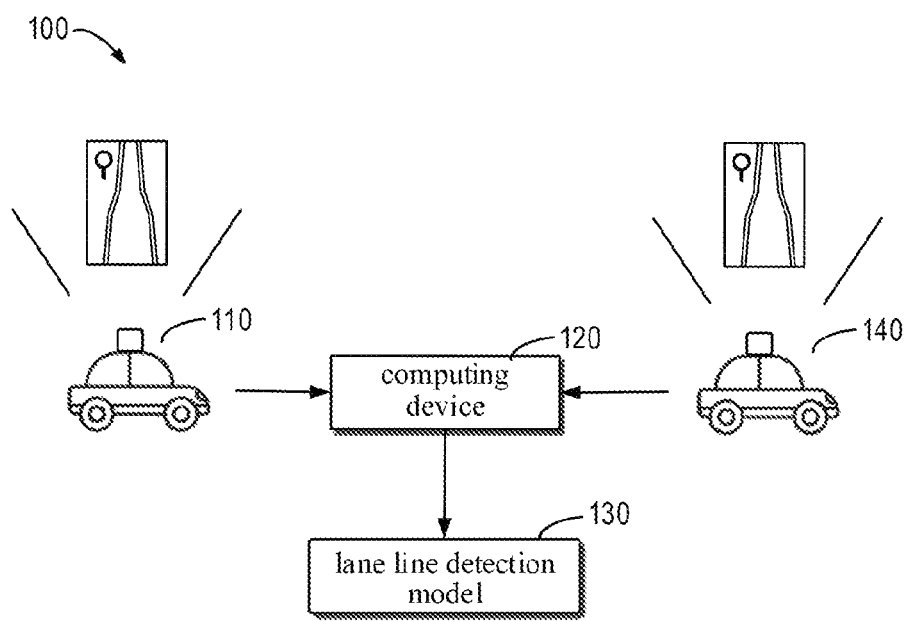
FIG. 1 illustrates a schematic diagram of an exemplary environment in which a plurality of embodiments of the present disclosure can be implemented.

The embodiments of the present disclosure will be described in more detail below with reference to the accompanying drawings. Certain embodiments of the present disclosure are shown in the accompanying drawings. However, it should be understood that the present disclosure may be implemented in various forms, and should not be interpreted as being limited by the embodiments described herein. Conversely, the embodiments are provided for a more thorough and complete understanding for the present disclosure. It should be understood that the accompanying drawings and embodiments in the present disclosure are only illustrative, and not used to limit the scope of protection of the present disclosure.

In the description for the embodiments of the present disclosure, the term "including" and similar terms thereof should be understood as open-ended (i.e., "including, but not limited to"). The term "based on" should be understood as "at least partially based on." The term "an embodiment" or "the embodiment" should be understood as "at least one embodiment." The terms "first," "second," and the like may refer to different or identical objects. Other explicit and implicit definitions may also be included hereinafter.

As mentioned above, in the traditional solution, the lane lines in the road are detected only through a traditional computer vision algorithm or only by deep learning. The solution in which the traditional computer vision algorithm is used has a low accuracy, and cannot satisfy the needs of the high-precision map and the autonomous driving. In particular, in the situation where there is interference of light (e.g., strong light) in the environment or the lane lines are complex, the lane lines in the road cannot be accurately detected.

In addition, the solution of directly using the deep learning has a poor universality. Since the solution of using the deep learning is based on, for example, an end-to-end convolutional neural network, the solution has problems such as the dependence on the diversity of the training data, a high model complexity, and a slow computing speed, which makes the solution unsuitable for detecting the lane lines in the road in any situation (e.g., a computing device without support of a high-performance graphics processing unit (GPU)).

In order to at least partially address the above problems and one or more of other potential problems, the exemplary embodiments of the present disclosure propose a solution for detecting lane lines. In this solution, the lane lines are automatically identified by combining the computer vision algorithm and the deep learning. In the process of generating a lane line detection model (also referred to as a training process), whether the detected lane lines are accurate is determined based on an image associated with the detected lane lines (referred to as a first image hereinafter) and an image associated with the marked lane lines (referred to as a second image hereinafter), and at least one tag indicating whether the detected lane lines are accurate is generated. Then, in the process of generating the model, the classifier model for automatically identifying the lane lines is trained based on the first image and the at least one tag.

In the process of detecting lane lines (also referred to as an application process), the automatic identification for the lane lines is achieved by inputting the first image associated with the detected lane lines into the above trained classifier model. In this way, the solution of the present disclosure simultaneously has the simplicity of the computer vision algorithm and the powerful generalization capability of the deep learning. Thus, the lane line detection may be achieved in a simple and effective way, thereby improving the performances of the high-precision map and the autonomous driving.

As used herein, the term "model" may learn the correlation between the respective input and output from the training data. Thus, a corresponding output may be generated for a given input after the training is completed. It should be understood that the "model" may also be referred to as a "neural network," a "learning model," or a "learning network."

Hereinafter, the embodiments of the present disclosure are discussed by taking the lane lines as an example. However, it should be understood that the solution of the present disclosure may be similarly applied to detecting other types of road information, for example, a speed limit.

The embodiments of the present disclosure will be described below with reference to the accompanying drawings.

FIG. 1 illustrates a schematic diagram of an exemplary environment 100 in which a plurality of embodiments of the present disclosure can be implemented. In the exemplary environment 100, the lane line detection model 130 is generated by the computing device 120. The computing device 120 may generate the lane line detection model 130 based on training data.

To be able to generate the lane line detection model 130, corresponding training data needs to be acquired. The acquisition entity 110 may be used to acquire the corresponding training data and provide the acquired training data to the computing device 120. For example, the acquisition entity 110 may be a vehicle or a mobile robot having an acquisition device such as a camera. In some embodiments, the computing device 120 may be implemented on the acquisition entity 110. Alternatively, the computing device 120 may be remote from the acquisition entity 110, and communicate with the acquisition entity 110 by means of a wired connection or wireless connection.

Figure 2A:
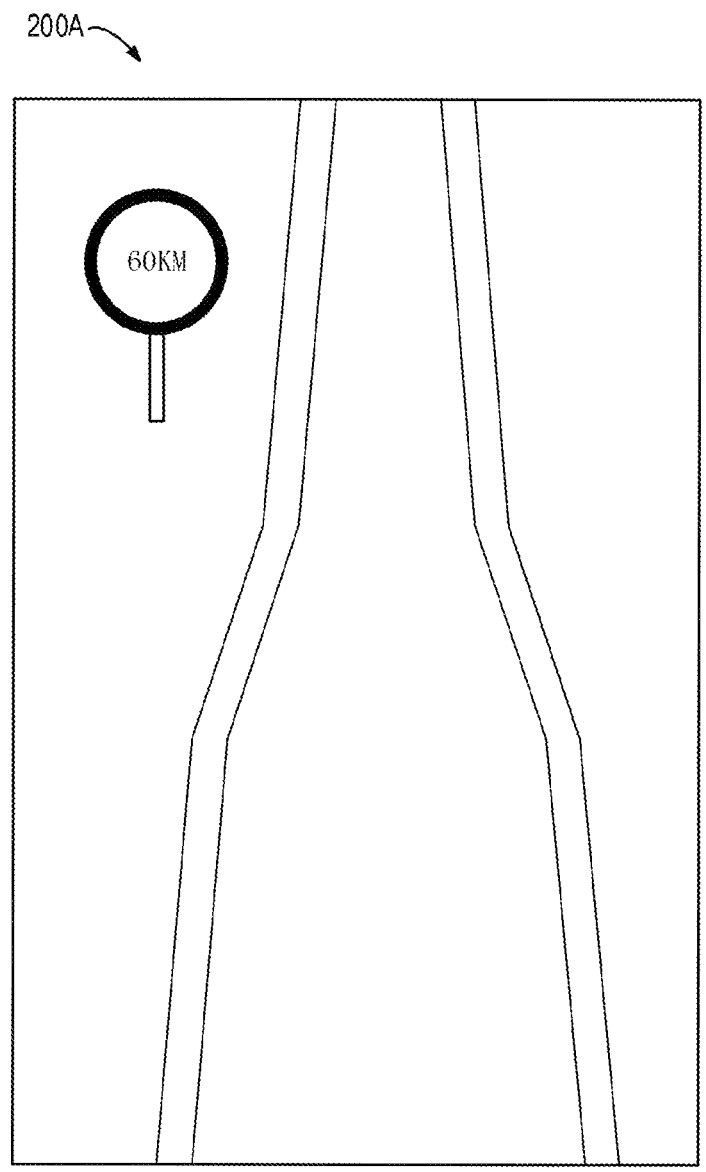
FIGS. 2A-2C respectively illustrate a schematic diagram of an original image, a schematic diagram of a first image, and a schematic diagram of a second image according to some embodiments of the present disclosure.

The training data may include an original image. FIG. 2A illustrates a schematic diagram of an original image 200A according to some embodiments of the present disclosure.

As shown in FIG. 2A, the original image 200A may be an image related to road information. For example, the original image 200A may be an image containing road information and acquired by the acquisition entity 110 during driving. Alternatively, the original image 200A may be independent of the road information.

The computing device 120 may detect the lane lines in the original image 200A to generate a first image associated with the detected lane lines. In some embodiments, the computing device 120 may detect the lane lines through a computer vision algorithm, and display the detected lane lines in the original image 200A, thus generating the first image 200B.

In some embodiments, the computing device 120 may use lane line points on the detected lane lines to show the detected lane lines. A lane line point may include one or more pixels. For example, the computing device 120 may show the detected lane lines by changing the color of the pixels corresponding to the lane line points on the detected lane lines on the original image 200A. Thus, the first image 200B is generated. Specifically, the computing device 120 may change the color of the pixels corresponding to the lane line points on the detected lane lines in the original image 200A to a color that does not appear or appear less in the original image 200A, so that the lane line points are distinguished from other graphic elements in the original image 200A to show the detected lane lines.

Figure 2B:
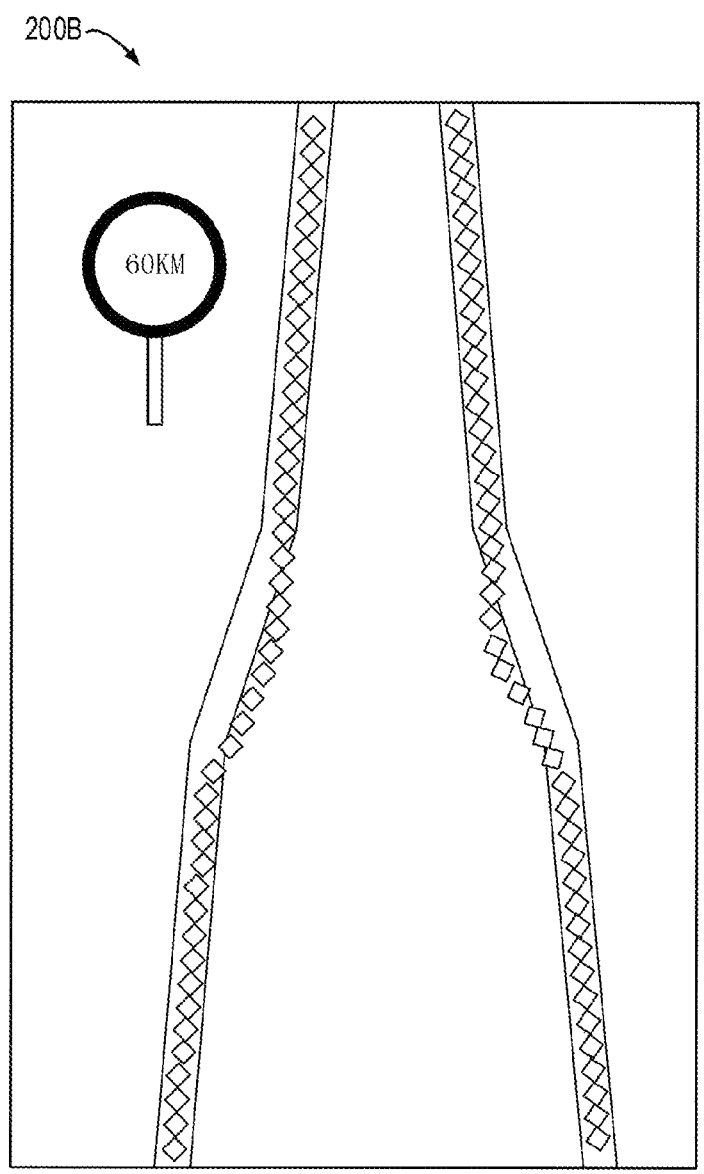

FIG. 2B illustrates a schematic diagram of a the first image 200B according to some embodiments of the present disclosure. As shown in FIG. 2B, the first image 200B is an image in which the lane line points are used to show the detected lane lines on the original image 200A.

In addition, the computing device 120 may acquire a second image generated based on the original image 200A and associated with the marked lane lines. The second image may be an image generated by marking the lane lines on the original image 200A. In some embodiments, the marking operation may be completed by a user. Alternatively, the marking operation may be automatically completed by the computing device 120 without the user.

Figure 2C:
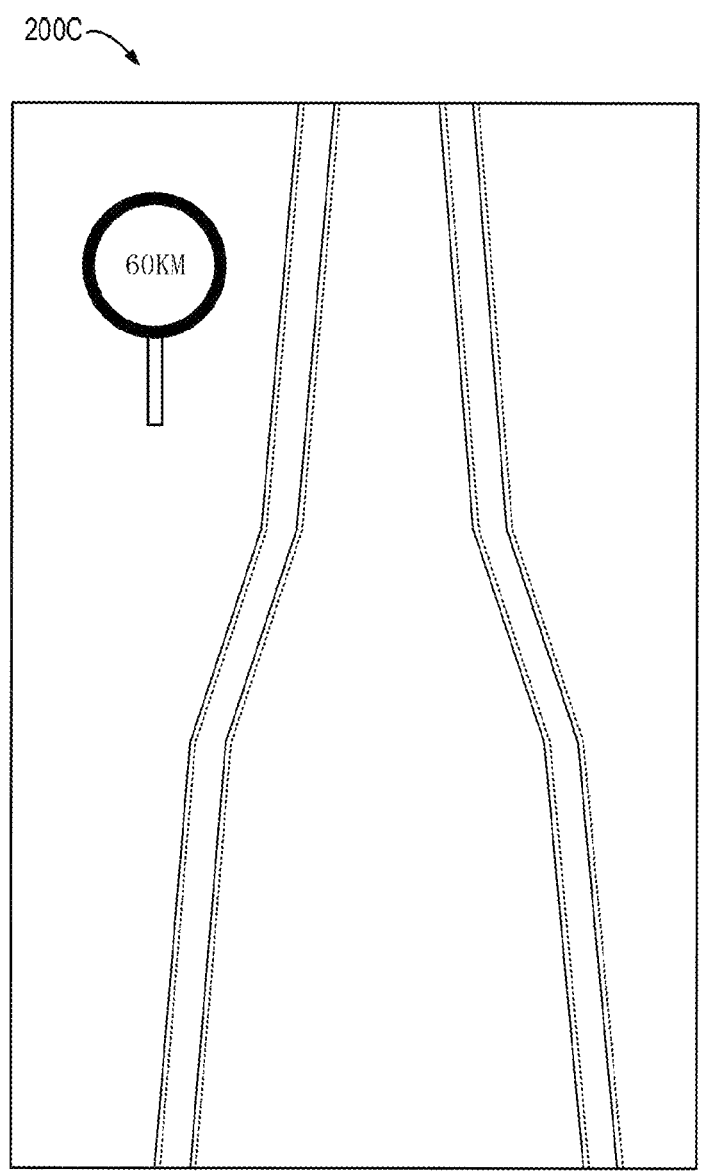

FIG. 2C illustrates a schematic diagram of a the second image 200C according to some embodiments of the present disclosure. As shown in FIG. 2C, the second image 200C is an image in which the lane lines are marked on the original image 200A using dotted lines. For clarity, in FIG. 2C, the actual lane lines and the lane lines marked with the dotted lines are not coincident. However, it should be understood that the actual lane lines may be coincident with the lane lines marked with the dotted lines. In some embodiments, to simplify the processing, the second image 200C may only retain the information related to the lane lines, to clearly mark the lane lines, which is a more suitable basis for determining whether the detected lane lines are accurate. For example, in the second image 200C, the lane lines and other graphic elements may be set to colors that easily distinguish from each other. Specifically, the color of the lane lines may be set to white while the color of the other graphic elements may be set to black.

Based on the first image 200B and the second image 200C, the computing device 120 may generate at least one tag indicating whether the detected lane lines are accurate. In some embodiments, the computing device 120 may compare the first image 200B with the second image 200C, to determine whether the detected lane lines are accurate based on whether the first image 200B matches the second image 200C, and generate the at least one tag indicating whether the detected lane lines are accurate.

In still other embodiments, the computing device 120 may determine whether the detected lane lines are accurate by determining whether the positions of the detected lane lines match the positions of the lane lines marked on the second image 200C, and generate the at least one tag indicating whether the detected lane lines are accurate. For example, the computing device 120 may determine whether the coordinates of the pixels of the lane line points on the detected lane lines in the first image 200B match the coordinate positions of the pixels of the lane lines marked on the second image 200C.

Then, based on the first image 200B and the at least one tag, the computing device 120 may train the classifier model 140 that is used for automatically identifying the lane lines. In the training process of the classifier model 140, the computing device 120 may modify the classifier model 140 based on the first image 200B and the at least one tag, such that the trained classifier model 140 may accurately determine whether the detected lane lines in the first image 200B are accurate.

In the process of applying the trained classifier model 140 to detect the lane lines, the computing device 120 may detect the lane lines in the to-be-detected original image 200A to generate the first image 200B associated with the detected lane lines. The acquisition entity 110 may be used to acquire the corresponding training data and provide the acquired training data to the computing device 120. The acquisition entity 110, the to-be-detected original image 200A, and the approach of generating the first image 200B are respectively similar to the above acquisition entity 110, the above original image 200A, and the above approach of generating the first image 200B, and thus the description thereof is omitted herein.

Then, the computing device 120 may input the first image 200B into the trained classifier model 140. The trained classifier model 140 may determine whether the detected lane lines on the first image 200B are accurate, to automatically identify the lane lines.

By combining the computer vision algorithm and the deep learning, the solution of the present disclosure can not only accurately detect the lane lines in the road in a situation where there is the interference of light (e.g., strong light) in the environment or the lane lines are complex, but also be suitable for detecting the lane lines in the road in the computing device without a powerful graphics processing capability.

Lane Line Detection Model Generating Process

Figure 3:
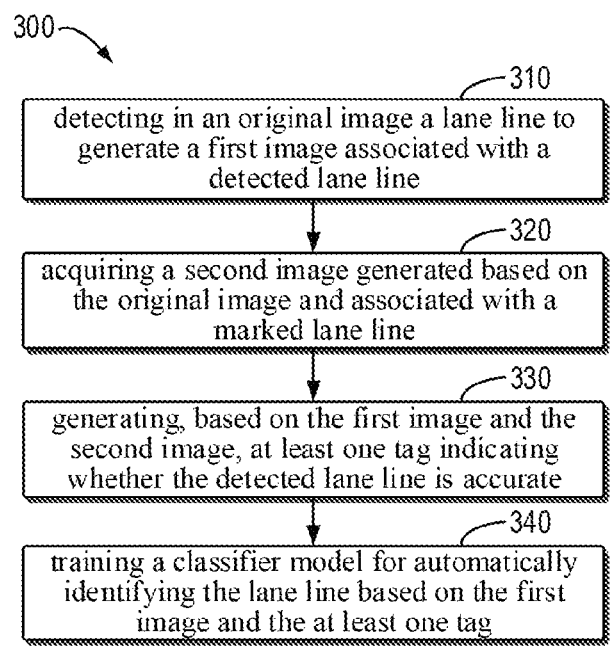
FIG. 3 illustrates a flowchart of a process of generating a lane line detection model according to some embodiments of the present disclosure.

FIG. 3 illustrates a flowchart of a process 300 of generating a lane line detection model according to the embodiments of the present disclosure. The process 300 may be implemented by the computing device 102. At block 310, the computing device 120 detects the lane lines in the original image 200A, to generate the first image 200B associated with the detected lane lines. Block 310 may also be referred to as an image processing process. Hereinafter, block 310 will be described in detail in combination with FIG. 4.

At block 320, the computing device 120 acquires the second image 200C generated based on the original image 200A and associated with the marked lane lines. As described above, the second image 200C may be the image generated by marking the lane lines on the original image 200A. In some embodiments, the marking operation may be completed by the user. Alternatively, the marking operation may be automatically completed by the computing device 120 without the user.

At block 330, based on the first image 200B and the second image 200C, the computing device 120 generates the at least one tag indicating whether the detected lane lines are accurate. Block 330 may also be referred to as a tag generating process. Hereinafter, block 330 will be described in detail in combination with FIG. 5.

At block 340, based on the first image 200B and the at least one tag, the computing device 120 trains the classifier model that is used for automatically identifying the lane lines. As described above, in the training process of the classifier model 140, the computing device 120 may modify the classifier model 140 based on the first image 200B and the at least one tag, such that the trained classifier model 140 may accurately determine whether the detected lane lines on the first image 200B are accurate. The generated lane line detection model may have the simplicity and the instantaneity benefiting from the computer vision algorithm, and simultaneously have the accuracy and the robustness benefiting from the deep learning.

Image Processing Process

Figure 4:
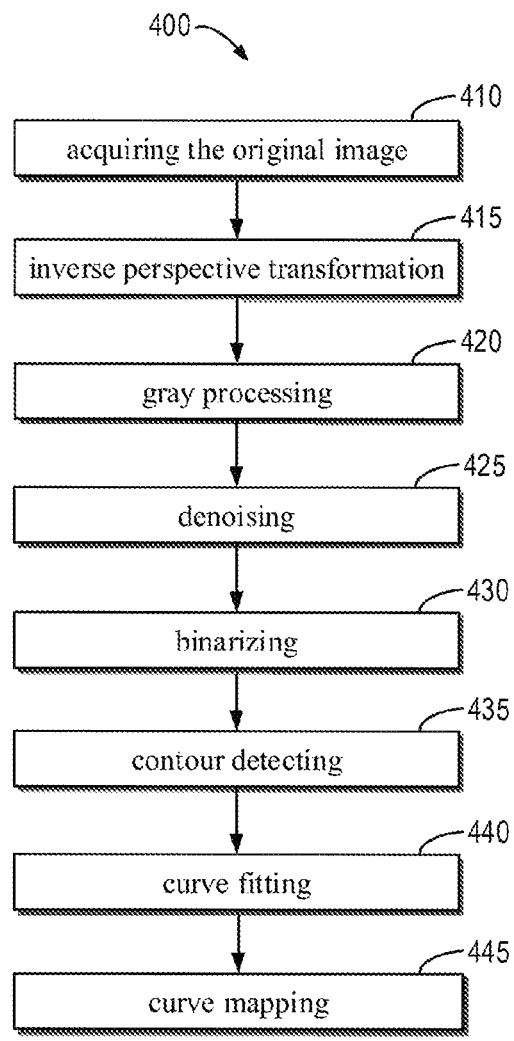
FIG. 4 illustrates a flowchart of a process of generating a first image according to some embodiments of the present disclosure.

FIG. 4 illustrates a flowchart of a process 400 of generating a the first image 200B according to some embodiments of the present disclosure. It will be appreciated that the process 400 may be considered as an exemplary implementation for block 310 in the process 300 described above. At block 410, the computing device 120 obtains the original image 200A from the acquisition entity 110.

At block 415, the computing device 120 performs an inverse perspective transformation on the original image 200A to generate an inverse-perspective transformed image. It may be understood that due to the principle of perspective the parallel lines in the real world will become intersecting lines in an image based on the distance. Based on the principle of perspective, the interval between the two lane lines on a road becomes smaller at the far end of the original image 200A, which is disadvantageous to the detection for the lane lines. Thus, to counteract the influence of the perspective effect on the original image 200A, the computing device 120 may perform the inverse perspective transformation on the original image 200A to generate the inverse-perspective transformed image, which is suitable for detecting the lane lines.

At block 420, the computing device 120 performs gray processing on the inverse-perspective transformed image. In some embodiments, the computing device 120 may perform the gray processing on the original image 200A to generate a grayed image. The gray processing performed on an image may remove the color of the image, and only retain the brightness of the image, thereby reducing the bytes of the image.

At block 425, the computing device 120 denoises the grayed image to generate denoised image. In some embodiments, the computing device 120 may denoise the original image 200A to generate the denoised image. The denoising the image may remove the noise from the image, which makes the image smoother. For example, the denoising may be achieved through algorithms such as Gaussian filtering or mean filtering.

At block 430, the computing device 120 binarizes the denoised image to generate a binary image. In some embodiments, the computing device 120 may binarize the original image 200A to generate a binary image. In still some embodiments, the computing device 120 may binarize the grayed image to generate a binary image. binarizing an image may set the brightness values of the pixels in the image to 0 or 255, such that the bytes of the image is reduced and the image is more suitable for detecting the lane lines.

At block 435, the computing device 120 applies a contour detection (also referred to as edge detection) on the binary image to generate the contours of the lane lines. In some embodiments, the computing device 120 applies the contour detection on the original image 200A to generate the contours of the lane lines. The contour detection on the image may retain important structural attributes of the lane lines, and remove unimportant or irrelevant information, such that the bytes of the image is further reduced and the image is more suitable for detecting the lane lines.

At block 440, the computing device 120 performs curve fitting on the generated contours of the lane lines to generate the curves representing the lane lines. The curve fitting on the contours of the lane lines may remove the deviation point on the contours of the lane lines. In some embodiments, the computing device 120 may segment the generated curves. For example, the computing device 120 may segment the curves into curve segments of 40 pixel lengths. In some embodiments, the curve segments may correspond to the detected lane line points. For example, in some embodiments, a curve segment may correspond to one detected lane line point. In still some embodiments, the curve segment may correspond to a set of detected lane line points. In such case, the subsequent processing may be performed on the image based on the curve segments rather than the entire curve, thereby reducing the computations required for each image processing operation.

At block 445, the computing device 120 generates the first image by mapping the curves to the original image. For example, as described above, the computing device 120 may show the detected lane lines by changing the color of the pixels corresponding to the lane line points on the detected lane lines on the original image 200A, thus generating the first image 200B. Specifically, the computing device 120 may change the color of the pixels corresponding to the lane line points on the detected lane lines on the original image 200A to the color that does not appear or appear less in the original image 200A, to distinguish the lane liens from the other graphic elements in the original image 200A and show the lane lines.

It is noted that the operations in the process 400 are described in a particular order, but the operations may be performed in an order different from the described order, performed in parallel, or omitted. For example, in some embodiments, the computing device 120 may perform the inverse perspective transformation on the generated gray graphic after performing the gray processing on the original image 200A. In still some embodiments, the computing device 120 may not denoise the image.

In this way, the first image 200B may be generated simply and effectively. In addition, since the first image 200B contains information of both the original image 200A and the detected lane lines, the detected lane lines may be supplemented with the help of the original image 200A even in the situation where the lane lines cannot be accurately detected due to the interference of light in the environment or the lane lines are complex, thus improves the accuracy.

Tag Generating Process

Figure 5:
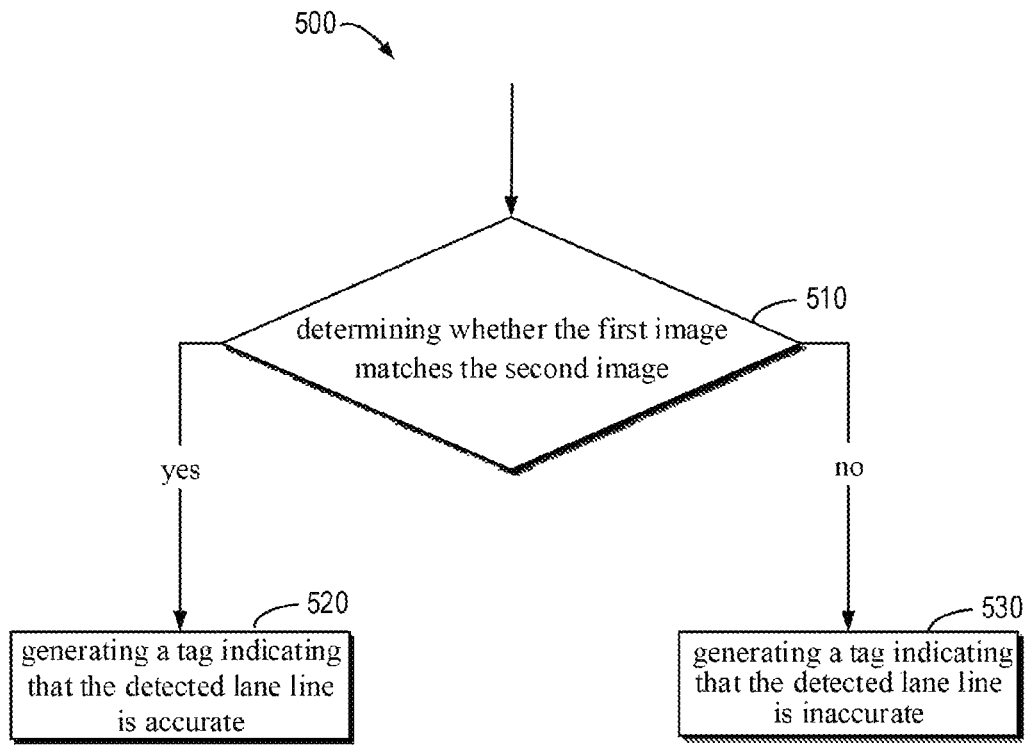
FIG. 5 illustrates a flowchart of a process of generating at least one tag according to some embodiments of the present disclosure.

FIG. 5 illustrates a flowchart of a process 500 of generating at least one tag according to some embodiments of the present disclosure. It will be appreciated that the process 500 may be considered as an exemplary implementation for block 330 in the process 300 described above. At block 510, the computing device 120 compares the first image 200B with the second image 200C to determine whether the first image 200B matches the second image 200C. In some embodiments, the computing device 120 may compare the first image 200B with the second image 200C to obtain a similarity between the first image 200B and the second image 200C. In the situation where the similarity exceeds a predefined threshold, the computing device 120 may determine that the first image 200B matches the second image 200C.

Alternatively, the computing device 120 may compare the positions of the detected lane lines in the first image 200B with the positions of the lane lines marked on the second image 200C to determine whether the first image 200B matches the second image 200C. Specifically, the computing device 120 may compare the coordinates of the pixels of the lane line points on the detected lane lines in the first image 200B with the coordinates of the pixels of the lane lines marked on the second image 200C. In the situation where the number of the coordinates of the pixels of the lane line points in the detected lane lines coincident with the coordinates of the pixels of the marked lane lines exceeds a predefined threshold, the computing device 120 may determine that the first image 200B matches the second image 200C.

In still some embodiments, since the positions on the original image 200A of the curves representing the lane lines correspond to the positions of the detected lane lines on the first image 200B, the computing device 120 may compare the positions on the original image 200A of the curves representing the lane lines with the positions of the lane lines marked on the second image 200C.

In some embodiments, the computing device 120 may divide the first image 200B into a first set of image blocks, each of which includes a portion of the detected lane lines. For example, in some embodiments, as described above, in the situation where the curves representing the lane lines are segmented, since the position of a curve segment on the original image 200A correspond to the position of a portion of the detected lane lines on the first image 200B, the computing device 120 may divide the first image 200B into the first set of image blocks based on the portion of the detected lane lines that corresponds to the curve segment. As described above, in some embodiments, the curve segments may correspond to the detected lane line points. In such case, the division approach may be understood as that the computing device 120 divides the first image 200B into the first set of image blocks based on the detected lane line points.

For example, the computing device 120 may generate an image block (also referred to as a partial view) surrounding a portion of the detected lane lines with the position of the portion of the detected lane lines on the first image 200B as a center. For example, in the situation where the curve segment has a length of 40 pixels, the corresponding portion of the detected lane lines (e.g., a set of lane line points) also has the length of 40 pixels. The computing device 120 may select the pixels around the portion of the detected lane lines with the portion of the detected lane line as the center, to generate the image block of, for example, 64×64 pixels.

In still some embodiments, the computing device 120 may divide the second image 200C into a second set of image blocks, each of which includes a portion of the marked lane lines. In this case, by comparing the corresponding image blocks in the first set of image blocks and the second set of image blocks, the computing device 120 may determine whether the corresponding image block matches. Alternatively, the computing device 120 may compare the position of the portion of the detected lane lines included in each image block in the first set of image blocks with the position of the portion of the marked lane lines included in the corresponding image block in the second set of image blocks.

For example, the computing device 120 may compare the coordinates of the pixels of the detected lane points included in the each image block in the first set of image blocks with the coordinates of the pixels of the marked lane lines included in the corresponding image block in the second set of image blocks. For the each image block, in the situation where the number of the coordinates of the pixels of the detected lane line points included in the image block coincident with the coordinates of the pixels of the marked lane lines (i.e., the corresponding coordinates are the same) exceeds a predefined threshold, the computing device 120 may determine that the image block matches the second image 200C.

Figure 10A:
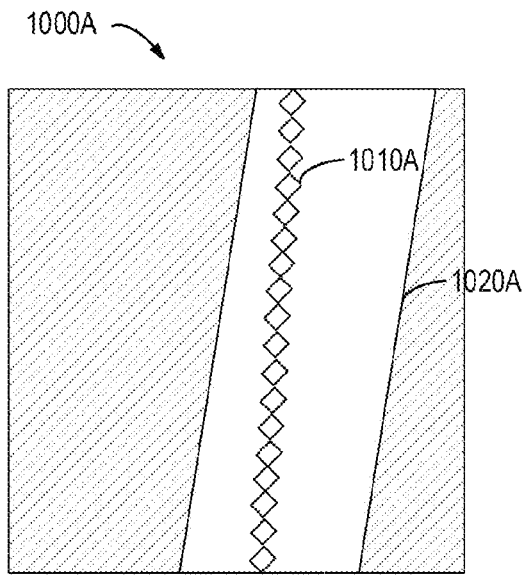
FIGS. 10A-10B respectively illustrate a schematic diagram in which an image block matches the second image, and a schematic diagram in which an image block does not match the second image.

FIG. 10A illustrates a schematic diagram of the matching between the image block 1000A and the second image 200C. As shown in FIG. 10A, since the detected lane line points 1010A included in the image block 1000A fall on the marked lane lines 1020A, the computing device 120 may determine that the image block matches the second image 200C. In this case, the image block 1000A may be used as a positive sample of the classifier model.

Figure 10B:
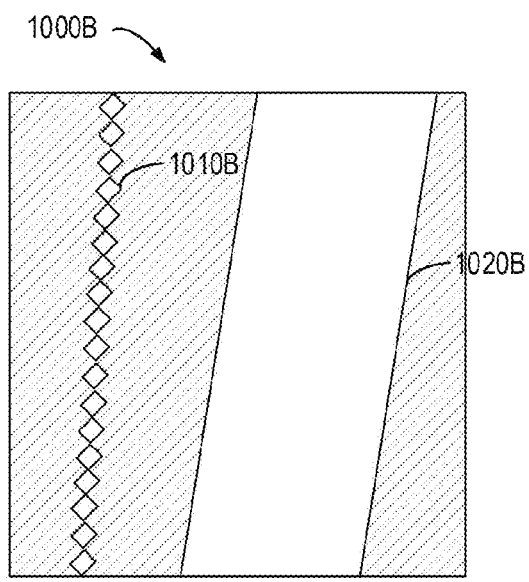

FIG. 10B illustrates a schematic diagram of the matching between the image block 1000B and the second image 200C. As shown in FIG. 10B, the image block 1000B includes the detected lane line points 1010B. However, since the detected lane line points 1010B included in the image block 1000B fall outside the marked lane lines 1020B, the computing device 120 may determine that the image block does not match the second image 200C. In this case, the image block 1000B may be used as a negative sample of the classifier model.

Alternatively, as described above, since the positions of the curves representing the lane lines on the original image 200A correspond to the positions of the detected lane lines on the first image 200B, the computing device 120 may compare the position of the curve segment corresponding to an image block in the first set of image blocks with the position of the portion of the marked lane lines included in the corresponding image block in the second set of image blocks.

In still some embodiments, the computing device 120 may not divide the second image 200C, and directly and respectively compare the first set of image blocks with the second image 200C. Alternatively, the computing device 120 may directly and respectively compare the portion of the detected lane lines included in the each image block in the first set of image blocks with the second image 200C. For example, the computing device 120 may directly and respectively compare the coordinates of the pixels of the detected lane points included in the each image block in the first set of image blocks with the second image 200C. Alternatively, as described above, since the positions of the curves representing the lane lines on the original image 200A correspond to the positions of the detected lane lines on the first image 200B, the computing device 120 may directly and respectively compare the positions corresponding to the image blocks in the first set of image blocks with the second image 200C.

If it is determined that the first image 200B matches the second image 200C, then at block 520, the computing device 120 generates at least one tag indicating that the detected lane lines are accurate. For example, the tag may indicate whether the first image 200B is a positive sample or a negative sample for the classifier model 140. The positive sample indicates that the first image 200B is detected as the lane lines. The negative sample indicates that the first image 200B is not detected as the lane lines. In some embodiments, in the situation where the first image 200B is divided into the first set of image blocks, for an image block in the first set of image blocks, the computing device 120 may generate a tag indicating the corresponding portion of the lane lines included in the image block is accurate.

Otherwise, at block 530, the computing device 120 generates at least one tag indicating that the detected lane lines are inaccurate. In some embodiments, in the situation where the first image 200B is divided into the first set of image blocks, for an unmatching image block in the first set of image blocks, the computing device 120 may generate a tag indicating the corresponding portion of the lane lines included in the image block is inaccurate. In this way, the at least one tag indicating whether the detected lane lines are accurate may be simply and effectively generated, to support the training on the classifier model.

Lane Line Detecting Process

Figure 6:
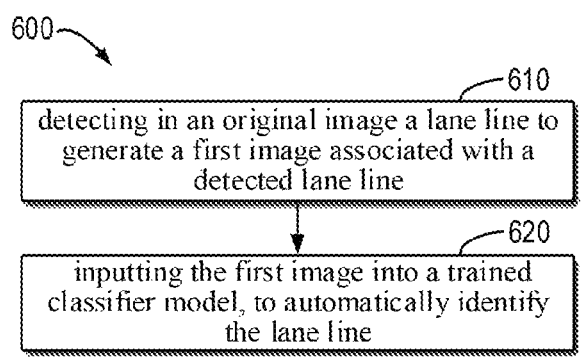
FIG. 6 illustrates a flowchart of a process of detecting lane lines according to some embodiments of the present disclosure.

The flowchart of the process of generating the lane line detection model is described above in combination with FIGS. 3-5. Hereinafter, the flow chart of the process 600 of detecting the lane lines will be described in combination with FIG. 6. At block 610, the lane lines are detected in the original image 200A, to generate the first image 200B associated with the detected lane lines. The operation of block 610 is similar to that of block 310 described above, and thus the description thereof is omitted herein.

At block 620, the first image 200B is inputted into the trained classifier model to automatically identify the lane lines. As described above, during the training, the classifier model has been trained using the first image 200B and the at least one tag indicating whether the detected lane lines on the first image 200B are accurate. Thus, the association between the first image 200B and the corresponding tag is generated. Therefore, during the application, based on the first image 200B and the association, the classifier model may generate a tag corresponding to the first image 200B, to indicate whether the detected lane lines on the first image 200B are accurate. Accordingly, the lane lines are automatically identified. In such case, by combining the computer vision algorithm and the deep learning, the lane line detection may be achieved in a simple and effective way, thereby improving the performances of the high-precision map and the autonomous driving.

Figure 7:
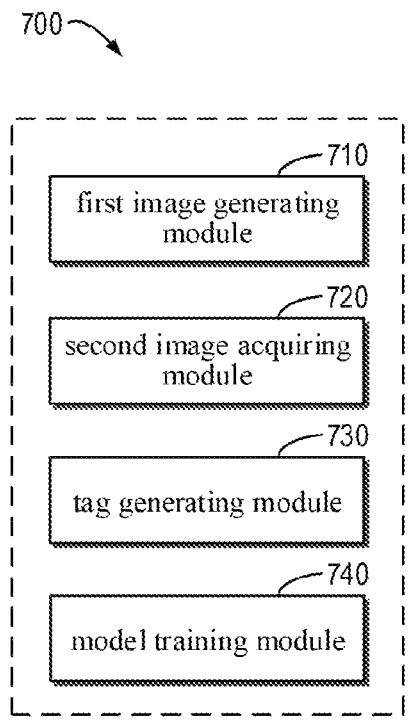
FIG. 7 illustrates a schematic block diagram of an apparatus for generating a lane line detection model according to the embodiments of the present disclosure.

FIG. 7 illustrates a schematic block diagram of an apparatus 700 for generating a lane line detection model according to the embodiments of the present disclosure. As shown in FIG. 7, the apparatus 700 includes: a first image generating module 710, configured to detect a lane line in an original image to generate a first image associated with a detected lane line; a second image acquiring module 720, configured to acquire a second image generated based on the original image and associated with marked lane line; a tag generating module 730, configured to generate at least one tag indicating whether the detected lane line is accurate, based on the first image and the second image; and a model training module 740, configured to train a classifier model for automatically identifying the lane line, based on the first image and the at least one tag.

In some embodiments, the first image generating module 710 includes: an inverse perspective transformation module, configured to perform an inverse perspective transformation on the original image; and an inverse-perspective-transformed image generating module, configured to detect the lane line in an inverse-perspective transformed original image, to generate the first image.

In some embodiments, the first image generating module 710 includes: a gray processing module, configured to perform gray processing on the original image to generate a grayed original image; a binarization module, configured to binarize the grayed original image, to generate a binary image; and a binary image generating module, configured to detect the lane line in the binary image to generate the first image.

In some embodiments, the first image generating module 710 includes: a denoising module, configured to denoise the original image to generate a denoised image; and a denoised image generating module, configured to detect the lane line in the denoised image to generate the first image.

In some embodiments, the first image generating module 710 includes: a contour detection module, configured to apply a contour detection on the original image to generate a contour of the lane line; and a contour-detected image generating module, configured to generate the first image based on the contour.

In some embodiments, the first image generating module 710 includes: a curve fitting module, configured to perform curve fitting on the contour to generate a curve representing the lane line; and a curve-fitted image generating module, configured to generate the first image by mapping the curve to the original image.

In some embodiments, the tag generating module 730 includes: a first image dividing module, configured to divide the first image into a first set of image blocks, wherein each of the image blocks includes a portion of the detected lane line; a second image dividing module, configured to divide the second image into a second set of image blocks, wherein each of the image blocks includes a portion of the marked lane line; and a partial tag generating module, configured to generate a plurality of tags for a plurality of portions of the detected lane line by comparing corresponding image blocks in the first and second set of image blocks, wherein each of the tags indicates whether a corresponding portion of the detected lane line is accurate.

Figure 8:
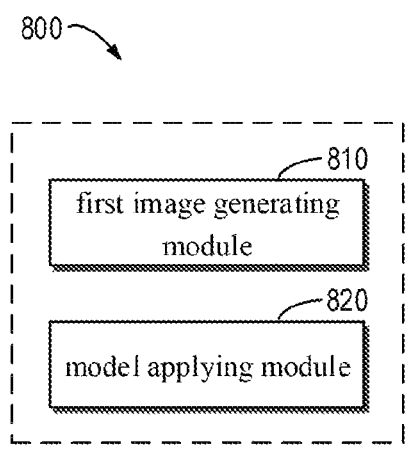
FIG. 8 illustrates a schematic block diagram of an apparatus for detecting lane lines according to the embodiments of the present disclosure.

FIG. 8 illustrates a schematic block diagram of an apparatus 800 for detecting a lane line according to the embodiments of the present disclosure. As shown in FIG. 8, the apparatus 800 includes: a first image generating module 810, configured to detect a lane line in an original image to generate a first image associated with the detected lane line; and a model applying module 820, configured to input the first image into a trained classifier model to automatically identify the lane line.

Figure 9:
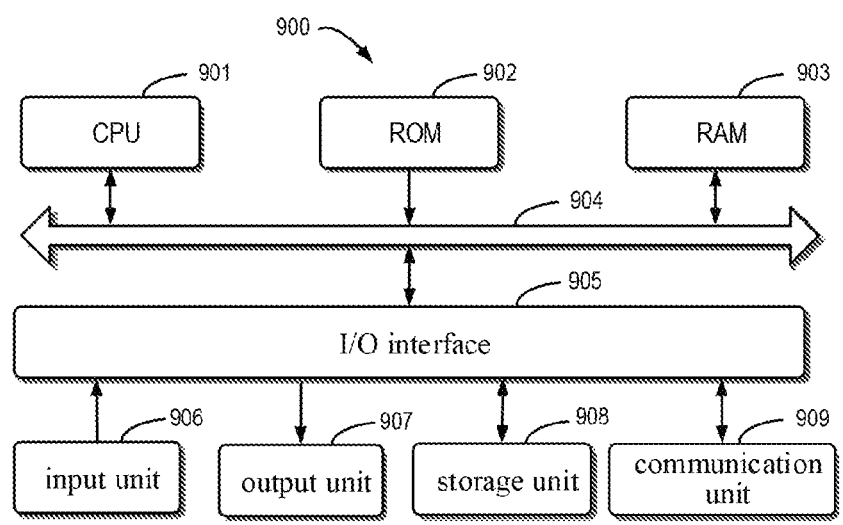
FIG. 9 illustrates a block diagram of a computing device in which the plurality of embodiments of the present disclosure can be implemented.

FIG. 9 shows a schematic block diagram of an exemplary device 900 capable of implementing various embodiments of the present disclosure. The device 900 may be used to implement the computing device 120 in FIG. 1. As shown in the figure, the device 900 includes a central processing unit (CPU) 901 that may perform various appropriate actions and processing in accordance with computer program instructions stored in a read only memory (ROM) 902 or computer program instructions loaded into a random access memory (RAM) 903 from a storage unit 908. In the RAM 903, various programs and data required for the operation of the device 900 may also be stored. The CPU 901, the ROM 902, and the RAM 903 are connected to each other through a bus 904. An input/output (I/O) interface 905 is also coupled to the bus 904.

A plurality of components in the device 900 are coupled to the I/O interface 905, including: an input unit 906, such as a keyboard or a mouse; an output unit 907, such as various types of displays, or speakers; the storage unit 908, such as a disk or an optical disk; and a communication unit 909 such as a network card, a modem, or a wireless communication transceiver. The communication unit 909 allows the device 900 to exchange information/data with other devices over a computer network such as the Internet and/or various telecommunication networks.

The processing unit 901 performs the various methods and processes described above, such as the process 300, 400, 500 and/or the process 600. For example, in some embodiments, the process 800 and/or the process 900 may be implemented as a computer software program that is tangibly embodied in a machine readable medium, such as the storage unit 908. In some embodiments, some or all of the computer programs may be loaded and/or installed onto the device 900 via the ROM 902 and/or the communication unit 909. When a computer program is loaded into the RAM 903 and executed by the CPU 901, one or more of the actions or steps of the process 300, 400, 500 and/or the process 600 described above may be performed. Alternatively, in other embodiments, the CPU 901 may be configured to perform the process 300, 400, 500 and/or the process 600 by any other suitable means (e.g., by means of firmware).

The functions described herein above may be performed, at least in part, by one or more hardware logic components. For example, and without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various actions are described in a specific order, this should not be understood that such actions are required to be performed in the specific order shown or in sequential order, or all illustrated actions should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although the embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. A method for generating a lane line detection model, comprising:
    detecting a lane line in an original image to generate a first image associated with a detected lane line;
    acquiring a second image generated based on the original image and associated with marked lane line;
    generating at least one tag indicating whether the detected lane line is accurate, based on the first image and the second image; and
    training a classifier model for automatically identifying the lane line, based on the first image and the at least one tag.

2. The method according to claim 1, wherein the generating a first image comprises:
    performing an inverse perspective transformation on the original image; and
    detecting the lane line in an inverse-perspective transformed original image, to generate the first image.

3. The method according to claim 1, wherein the generating a first image comprises:
    performing gray processing on the original image to generate a grayed original image;
    binarizing the grayed original image, to generate a binary image; and
    detecting the lane line in the binary image to generate the first image.

4. The method according to claim 1, wherein the generating a first image comprises:
    denoising the original image to generate a denoised image; and
    detecting the lane line in the denoised image to generate the first image.

5. The method according to claim 1, wherein the generating a first image comprises:
    applying a contour detection on the original image to generate a contour of the lane line; and
    generating the first image based on the contour.

6. The method according to claim 5, wherein the generating the first image based on the contour comprises:
    performing curve fitting on the contour to generate a curve representing the lane line; and
    generating the first image by mapping the curve to the original image.

7. The method according to claim 1, wherein the generating at least one tag comprises:
    dividing the first image into a first set of image blocks, wherein each of the image blocks includes a portion of the detected lane line;

dividing the second image into a second set of image blocks, wherein each of the image blocks includes a portion of the marked lane line; and generating a plurality of tags for a plurality of portions of the detected lane line by comparing corresponding image blocks in the first and second set of image blocks, wherein each of the tags indicates whether a corresponding portion of the detected lane line is accurate.

8. A method for detecting a lane line, comprising:

detecting a lane line in an original image to generate a first image associated with the detected lane line; and inputting the first image into the classifier model according to one of claims 1-7, to automatically identify the lane line.

9. An apparatus for generating a lane line detection model, comprising:

at least one processor; and a memory storing instructions, the instructions when executed by the at least one processor, cause the at least one processor to perform operations, the operations comprising:

detecting a lane line in an original image to generate a first image associated with a detected lane line;

acquiring a second image generated based on the original image and associated with marked lane line;

generating at least one tag indicating whether the detected lane line is accurate, based on the first image and the second image; and training a classifier model for automatically identifying the lane line, based on the first image and the at least one tag.

10. The apparatus according to claim 9, wherein the generating a first image comprises:

performing an inverse perspective transformation on the original image; and detecting the lane line in an inverse-perspective transformed original image, to generate the first image.

11. The apparatus according to claim 9, wherein the generating a first image comprises:

performing gray processing on the original image to generate a grayed original image;

binarizing the grayed original image, to generate a binary image; and detecting the lane line in the binary image to generate the first image.

12. The apparatus according to claim 1, wherein the generating a first image comprises:

denoising the original image to generate a denoised image; and detecting the lane line in the denoised image to generate the first image.

13. The apparatus according to claim 9, wherein the generating a first image comprises:

applying a contour detection on the original image to generate a contour of the lane line; and generating the first image based on the contour.

14. The apparatus according to claim 13, wherein the generating the first image based on the contour comprises:

performing curve fitting on the contour to generate a curve representing the lane line; and generating the first image by mapping the curve to the original image.

15. The apparatus according to claim 9, wherein the generating at least one tag comprises:

dividing the first image into a first set of image blocks, wherein each of the image blocks includes a portion of the detected lane line;

dividing the second image into a second set of image blocks, wherein each of the image blocks includes a portion of the marked lane line; and generating a plurality of tags for a plurality of portions of the detected lane line by comparing corresponding image blocks in the first and second set of image blocks, wherein each of the tags indicates whether a corresponding portion of the detected lane line is accurate.

16. An apparatus for detecting a lane line, comprising:

at least one processor; and a memory storing instructions, the instructions when executed by the at least one processor, cause the at least one processor to perform the operations according to claim 8.

17. A non-transitory computer readable storage medium storing a computer program, wherein the program, when executed by a processor, cause the processor to perform the operations according to claim 1.

18. A non-transitory computer readable storage medium storing a computer program, wherein the program, when executed by a processor, cause the processor to perform the operations according to claim 8.

* * * * *